Patented June 6, 1950

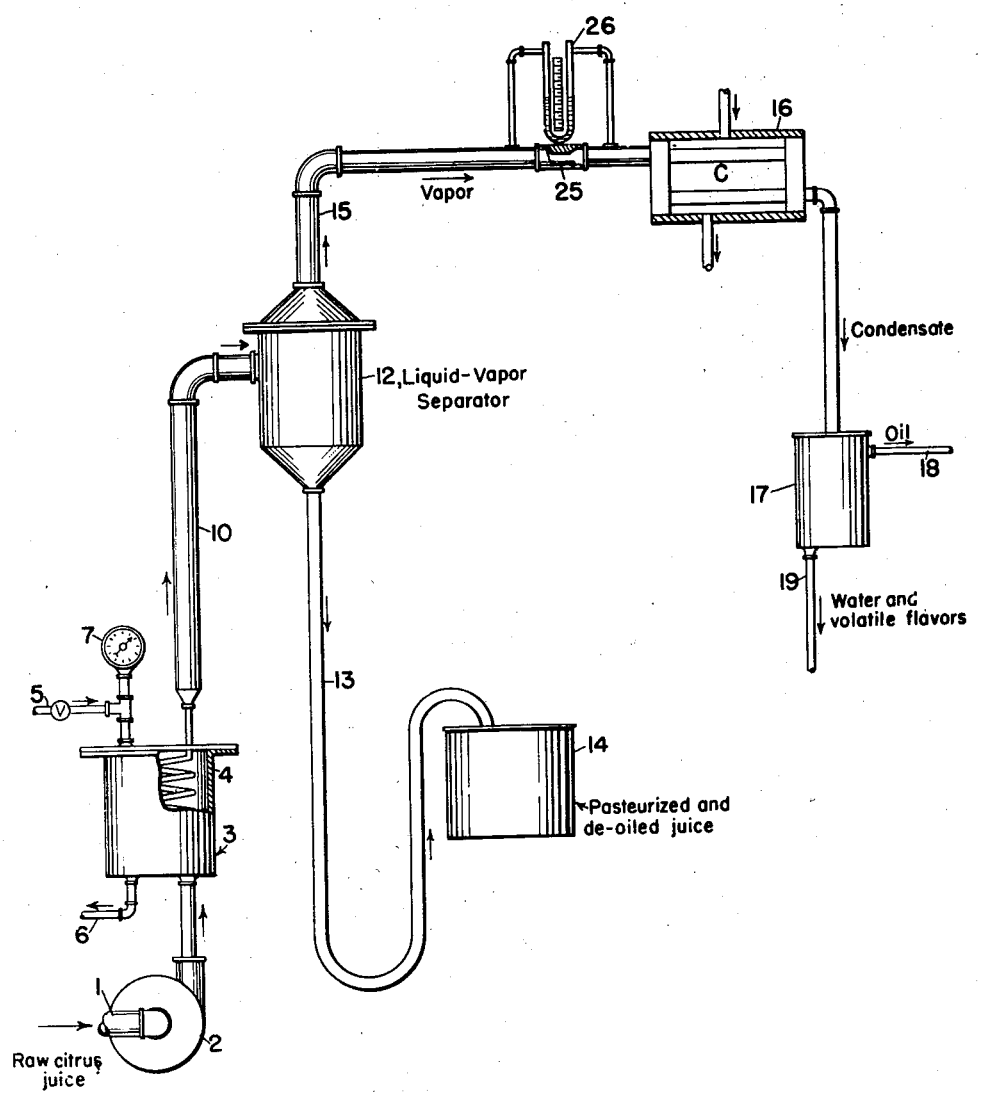

2,510,138

UNITED STATES PATENT OFFICE 2,510,138

CITRUS JUICE AND REMOVAL OF VOLATILE OILS THEREFROM

George N. Pulley and Matthew K. Veldhuis, Winter Haven, Fla., assignors to the United States Government as represented by the Secretary of Agriculture Application January 24, 1947, Serial No. 724,218

3 Claims. (Cl. 99—155)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production of citrus fruit juices.

In commercial operations, juices are extracted from citrus fruits by machines. The juices are then treated in various manners and canned for sale. In the process of extracting juices, certain volatile oils, sometimes referred to as recoverable oil or peel oil, are usually extracted from the peel and remain in the juice.

The quality of the canned juice in large measure depends on the amount of volatile oil contained therein. It is desirable from the standpoint of quality that the oil content be kept at a low value in the product. For example, according to standards established by the United States Department of Agriculture, in order to be classified as Grade A (Fancy), the content of volatile oil must not be above 0.014 percent for grapefruit juice or above 0.03 percent for orange juice. Citrus juices with higher volatile oil contents are classified as less desirable (Grade C or Substandard).

According to known methods, there are several ways of decreasing the content of volatile oil in the juice. One of these involves the adjustment of the machines used in extracting the juice, as by decreasing the pressure on the fruit, thus to decrease the amount of oil pressed from the peel. Due to differences in the thickness of the peel, the size of the fruit and so forth, it is difficult to adjust the machines to efficient removal of the juice without incorporating the volatile oil in excess of the standards mentioned. If the machines are adjusted to prevent extraction of too large a quantity of the oil, the yield of juice is greatly reduced.

According to another method, the fruit is heated for about 5 minutes in hot water before the juice is extracted. This results in a softening of the peel and in volatilization of some of the oil therefrom, so that less oil is obtained in the extracted juice. The method, however, is subject to question and not entirely effective.

A third method involves the use of so-called vacuum deoilers. In the equipment used for this purpose, the juices containing the oil pass through tubular heat exchangers under high vacuum and a portion of the juice is boiled off, carrying with it the volatile oil. This method is effective in removing the oil, but it is expensive, because the equipment must withstand high vacuum, must be large to take care of the large volumes of vapors encountered at low pressures, and large condensers are necessary. Also, a rather large portion of the juice must be vaporized in order to remove the oil, it being not uncommon to vaporize as much as from 5 to 10 percent. This involves a heating expense. Furthermore, after vaporization or removal of the volatile oil, it is yet necessary to pasteurize the juice before canning it, since the temperature utilized in the vacuum equipment is usually not high enough for pasteurization purposes.

It is the object of the present invention to remove the volatile oil with less expensive equipment at a lower operating cost and without impairing the quality of the canned juices, to permit efficient extraction of the juice from the fruit and simultaneously to pasteurize the juice and remove the oil.

In general, according to the invention, extracted juice containing the volatile oil (and preferably deaerated) is rapidly heated to boiling temperature under substantially atmospheric conditions, thus to pasteurize the juice and evaporate a small portion of it (.5 to 5 percent). This is accomplished by passing the juice through a tubular heater. Preferably, the mixture of liquid and vapor is then passed through what may be termed an equalizing chamber, in which the rate of flow is reduced so that the vapor bubbles through the liquid. The juice should be held in this chamber not less than three seconds. By doing this, the oil content of the vapors more closely approaches equilibrium with the liquid, that is, the volatile oil vaporizes from the juice into the bubbles, and the volatile oil is more efficiently removed. The vapors containing the volatile oil are then separated from the liquid, as by means of a liquid and vapor separator in which the liquids fall to the bottom and the vapors pass out of the top. The liquids may be collected from the bottom of the separator and fed directly into the container of a standard canning machine. The vapors are then condensed and the condensate collected and settled. The oil component floats and is readily separated from the balance of the condensate as by decanting. The condensate from which the oil has been removed contains water and certain volatile flavors and preferably is returned to the pasteurized juice in the container of the canning machine.

For a more detailed description of the invention, reference may be had to the accompanying drawing, which shows schematically in a single figure the apparatus used in carrying out the process.

In the drawing, the extracted juice is fed through a pipe 1 and pumped by the pump 2 into a coil heater 3. This heater may be of conventional design, as for example, a coil surrounded by a steam jacket 5, having a steam inlet 5, a steam outlet 6 and a pressure gage 7 for indicating the steam pressure. This heater should operate at a temperature which may be regulated by varying the steam pressure, to boil the juice during the small interval of time that the juice is in the heater. The time of heating, which depends on the coil capacity and rate of flow, should be so regulated as to evaporate from .5 to 5 percent of the liquid juice under atmospheric conditions. By keeping the time of contact short, the juice is pasteurized but is not deleteriously affected by the heat. The rate of flow should be adjusted so as to allow a heating time of from 2 to 15 seconds in which case the steam pressure used and temperature attained will be governed by the amount of evaporation desired.

After passing through the coil of the heater, the juice and vapor enter the equalizing chamber 10, which is in the form of an upright tube larger in diameter than that of the coil. In this chamber rate of flow of the juice is reduced somewhat, and the vapor bubbles through the juice. The dimensions should be so chosen that the liquid is held in the equalizing chamber for not less than 3 seconds. During this time, more of the volatile oil vaporizes from the juice into the bubbles of vapor.

After passage through the equalizing chamber, the combined vapor and liquid feed into a liquid-vapor separator 12, which may be of conventional design. In this separator, the liquid falls to the bottom and may be drained through a pipe 13 into a container 14 which may be the feed container of a conventional canning machine. The gas passes from the top of the separator through a pipe 15 and into a condenser 16. The condensate feeds from the condenser to a decanter 17. In this decanter the oil floats and may be removed as by a spigot 18, and the balance of the condensate removed through a pipe 19 and separately collected or passed directly to the container 14 if the system be operated continuously and it be desired to return the deoiled condensate to the juice.

In order to measure the rate of evaporation, which when compared to the rate of flow of juice through the heater can be used to determine the percentage of juice being evaporated, a gas flow meter may be placed in the pipe 15. This meter may be of conventional design, such as a venturi 25 in the pipe and a differential gas pressure measuring meter 26 connected to opposite sides of the venturi and calibrated to measure gas flow.

It is not essential that the equalizing chamber 10 be employed, and the process can be carried out by passing the heated juice directly from the heater to the separator 12. However, by employing the equalizing chamber, a more efficient removal of the oil is obtained, and it is preferable to use it.

As before mentioned, it is desirable that the system be operated under substantially atmospheric pressure, since at this pressure the temperature required to bring the juice to a boil and vaporize the necessary portion is sufficiently high to pasteurize the juice.

Operating at atmospheric conditions, experiment shows that with evaporation of 0.7 percent orange juice containing 0.058 percent volatile oil, a pasteurized juice containing only 0.022 percent of volatile oil was obtained.

The system can, of course, be operated under vacuum. In an experiment conducted under vacuum of 26 inches of mercury using orange juice with a volatile oil content of 0.068 percent, vaporizing 1.30 percent of the juice and utilizing the equalizing chamber, a juice containing only 0.028 percent volatile oil was obtained. This shows that a sufficient deoiling can be obtained using the equalizing chamber with an evaporation of a much smaller portion of the juice than has been possible with prior art industrial equipment operating under vacuum. Under these conditions, however, it is necessary, if the juice is to be canned, to pasteurize it separately.

Other citrus juices such as grapefruit juice, tangerine juice, lime juice, lemon juice and blends of these juices, may be processed according to the invention.

Having thus described the invention, what is claimed is:

1. A method of simultaneously pasteurizing citrus fruit juice and removing volatile oil therefrom comprising rapidly heating raw citrus fruit juice containing volatile oil to a boiling temperature at substantially atmospheric pressure to evaporate from .5 to 5 percent of the juice by passing the juice through a tubular heater, then passing the juice through a chamber in which the juice is held not less than 3 seconds to allow the vapor to bubble through the juice, whereby more of the volatile oil vaporizes from the juice into the bubbles of vapor, and then separating the vapor containing the volatile oil from the liquid juice.

2. The method of claim 1 wherein the vapor after separation from the liquid juice is condensed and the oil is removed from the condensate.

3. A method of removing volatile oil from citrus fruit juice comprising heating raw citrus fruit juice containing volatile oil to evaporate from .5 to 5 percent of the juice by passing the juice through a tubular heater, and then passing the juice through a chamber in which the juice is held not less than 3 seconds to allow the vapor to bubble through the juice, whereby more of the volatile oil vaporizes from the juice into the bubbles of vapor.

GEORGE N. PULLEY.
MATTHEW K. VELDHUIS.

REFERENCES CITED

The following references are of record in the file of this patent:

UNITED STATES PATENTS

| Number | Name | Date |
| --- | --- | --- |
| 1,730,892 | Leslie | Oct. 8, 1929 |
| 1,734,534 | Shields | Nov. 5, 1929 |
| 1,989,399 | Browne | Jan. 29, 1935 |
| 2,151,644 | Stephens | Mar. 21, 1939 |
| 2,347,339 | Singleton | Apr. 25, 1944 |
| 2,393,475 | McKinnis | Jan. 22, 1946 |
| 2,423,747 | Zahm | July 8, 1947 |
| 2,450,097 | Singleton | Sept. 28, 1948 |